US007269822B2

(12) United States Patent
Gebhart et al.

(10) Patent No.: US 7,269,822 B2
(45) Date of Patent: Sep. 11, 2007

(54) TECHNIQUE FOR ENABLING APPLICATIONS TO USE LANGUAGES OTHER THAN THEIR BUILT-IN MACRO-LANGUAGES WITHOUT CHANGING THE APPLICATIONS

(75) Inventors: Alexander Gebhart, Koengen (DE); Juergen Jung, Aidlingen (DE)

(73) Assignee: International Business Machines Corporation, Armonk, NY (US)

( * ) Notice: Subject to any disclaimer, the term of this patent is extended or adjusted under 35 U.S.C. 154(b) by 1211 days.

(21) Appl. No.: 09/792,653

(22) Filed: Feb. 23, 2001

(65) Prior Publication Data

US 2001/0025373 A1    Sep. 27, 2001

(30) Foreign Application Priority Data

Feb. 23, 2000   (EP)   ................................. 00103743

(51) Int. Cl.
G06F 9/44    (2006.01)
G06F 9/45    (2006.01)
G06F 9/46    (2006.01)

(52) U.S. Cl. ......................... 717/114; 717/136; 719/315

(58) Field of Classification Search ................ 717/114, 717/136, 137, 139, 140; 719/315; 345/744
See application file for complete search history.

(56) References Cited

U.S. PATENT DOCUMENTS 5,515,536 A * 5/1996 Corbett et al. .............. 719/315
5,815,714 A * 9/1998 Shridhar et al. ............ 717/129
6,067,413 A * 5/2000 Gustafsson et al. ......... 717/137
6,381,737 B1* 4/2002 Click et al. ................. 717/136
6,522,343 B2* 2/2003 Sobeski et al. ............. 345/744
6,675,371 B1* 1/2004 York et al. .................. 717/114

OTHER PUBLICATIONS

Java Native Interface Specification (May 16, 1997), Sun Microsystems, Inc., accessed from http://java.sun.com/products/archive/jdk/1.1/ on Jul. 20, 2005 (70 pages).*

* cited by examiner

Primary Examiner—Tuan Dam
Assistant Examiner—Michael J Yigdall
(74) Attorney, Agent, or Firm—Winstead PC

(57) ABSTRACT

A technique for improving the usage of built-in macro languages of applications by end users is provided. This technique enables the user to program in the programming language of his choice more easily. The source code of to user-selected language is stored in objects of the existing application and, if the language is a compiler language, the compiled code and the compiler itself are stored. A Bytecode Processing Server (BPS) is stored in an object of the existing application. This permits the use of the new macro language anywhere without additional installation efforts. The BPS and the existing application communicate via a stub program, which is written in the built-in macro language. This comprises parameter passing and data transfer.

6 Claims, 5 Drawing Sheets

BPS: Bytecode Processing Server

TECHNIQUE FOR ENABLING APPLICATIONS TO USE LANGUAGES OTHER THAN THEIR BUILT-IN MACRO-LANGUAGES WITHOUT CHANGING THE APPLICATIONS

BACKGROUND OF THE INVENTION

1. Field of the Invention

The present invention relates to reducing the amount of work required to customize application programs. In particular, it relates to a method and system for improving and extending the usage of built-in macro languages of applications used by end users for programming.

2. Description of the Related Art

Standardized application programs are commonly used in modern business environments. Examples of such programs include office solutions which include the basic software tools required for doing daily work of word or text processing, spreadsheet analysis, the use of relational databases, presentation programs, etc. People who use such application programs are referred to herein as end users.

Such, many application programs covering a number of particular aspects, such as e.g., sales tax calculation, salary administration, personnel administration, materials administration, etc., in the workflow of an enterprise, form the application program.

Since these programs are standardized programs intended for public use, the programs are not customized. That is, they are not adapted to the needs of a particular enterprise, firm or private person.

Thus, there is often a necessity for end users to customize an existing application to fit their specific needs. In this context, the end user is usually a developer. Therefore, "end user" and "developer" will be used as an equivalent throughout this document.

In order to carry out such customization work, the end user usually depends on the built-in macro languages of the application. Languages other than the built-in macro languages cannot be used. This, however, is a considerable disadvantage, because the customization work then requires a specific skill. Further, already existing code programmed in a different programming language cannot be re-used for this purpose and must be somehow ported or translated.

The present invention provides a very general solution and can be applied whenever the code of an application program itself may not be modified to make changes which require a recompilation of the application program itself.

Particular and arbitrarily chosen examples are applications like Lotus Notes or Microsoft Word. The built-in macro languages are Lotusscript or WordBasic, respectively. Using Microsoft Word, an end user does not have the ability to use, for example, Java, as a macro language. The same is true for all 4.x versions of Lotus Notes.

When an end user wants to use a language not included in the application, the end user is constrained to write a program, e.g., a C language program, compile it, link it and then call self-written program from within the existing application. The major disadvantage of this prior art approach is the separation of the self-written code and existing application. Seeing the best case, this is only an inconvenience for the end user to have code and application in different places, which makes maintenance more difficult. But in the majority of cases, in which a multitude of users have a multitude of customization programs this approach is not practical at all as the self written code is stored separate from the application.

One reason for this is deployment. The self-written program has to be installed anywhere the existing application is supposed to be used. Another reason is replication. If an existing application supports replication, only the objects belonging to this application are replicated, but no separated additional code or programs. Further, the performance of a network application server can be degraded by the additional task(s).

In an existing version of Lotus Notes, Java can be used as built-in macro language. When a Java program is executed, however, Java is restricted to run in specific programming areas, like the Notes Agents. This is, however, not advantageous, particularly in cases when the application program is installed in a network environment and is used by a multitude of users. In this situation, the performance of the application server is reduced remarkably.

Accordly, one object of the present invention is to improve the flexibility of application programs for the purpose of macroprogramming in order to give the end user the chance to use a language of his choice. A new possibility is intended to be offered to use other languages than the built-in macro languages of existing applications without changing the existing applications and without the requirement of installing specific additional programs to process the code written in the user-selected language.

SUMMARY OF THE INVENTION

The basic assumption the present invention starts from is that an existing application has a built-in macro language. This macro language usually is stored in some place where the existing application can access and use it, e.g. a Word document in Microsoft Word for Windows, a Lotus Notes form, a Lotus 1-2-3 spreadsheet, a Microsoft Access database, etc.

Generally, there are various ways of storing data within objects of an existing application which can be accessed and manipulated by the built-in macro language or by the end user: hidden rich text fields in a NOTES form, a hidden chapter in a WORD document, a subroutine of the macro language or a comment in a macro language program.

To keep the present introduction into the inventory concepts simple it is assumed that the self-selected language the end user wants to use instead of the built-in macro language is an interpreter language. According to one aspect of the present invention the interpreter itself is stored as data in an object of the existing application.

To use the language of choice, the end user first has to write the code in the appropriate syntax and to store the code at a location, i.e., in an object, where it can be accessed by the built-in macro language. Then, during runtime, a piece of code written in the native, built-in macro language is called. This code is comparable to a stub, and will thus simply referred to like that.

First, this stub has to check whether the interpreter is available on the operating system. If not, the interpreter is detached from its location within the application. If necessary, there are various possibilities to detect the operating system, such as, for example, by calling a specific function that is only available within a certain operating system or via calling a function that detects the operating system directly.

Next, the code in the user-selected language is detached, i.e., the code is extracted from the associated object of the present program application. The interpreter is invoked to process this code. Finally, after processing has been completed, the stub returns control to the application.

Basically, this fundamental inventional approach may be realized with any language that is interpreted at run time, and with any compiler language, as well. Particular advantages can be achieved by using the Java language because the end user can use the Java Virtual Machine of his choice and can thus run his macro where ever this seems advantageous for him, i.e., to get the result as soon as possible. For example, he could run it on a server in the network which is not identical to the application server itself. In many cases this helps to reduce the response time, in particular in situations in which many end users in a network share the same application server. Beyond that, Java programing language can be integrated in any execution environment which does not natively support Java as an end user macro language.

Further, whether it is a single customer or a company, it is usually beneficial to have as few programming languages employed as possible involved to solve a specific problem. The main reasons for this is maintenance and educational costs. Other reasons are that a given problem might not be solved with the built-in macro language, or the performance is not appropriate.

Thus, the basic advantage of the invention is that an end user can use the language of his choice within an existing application, which has a positive impact on maintenance and educational costs without having the disadvantages of separating self-written code from the existing application.

BRIEF DESCRIPTION OF THE DRAWINGS

The present invention is illustrated by way of example and is not limited by the shape of the figures of the accompanying drawings in which.

DESCRIPTION OF THE PREFERRED EMBODIMENT

Figure 1:
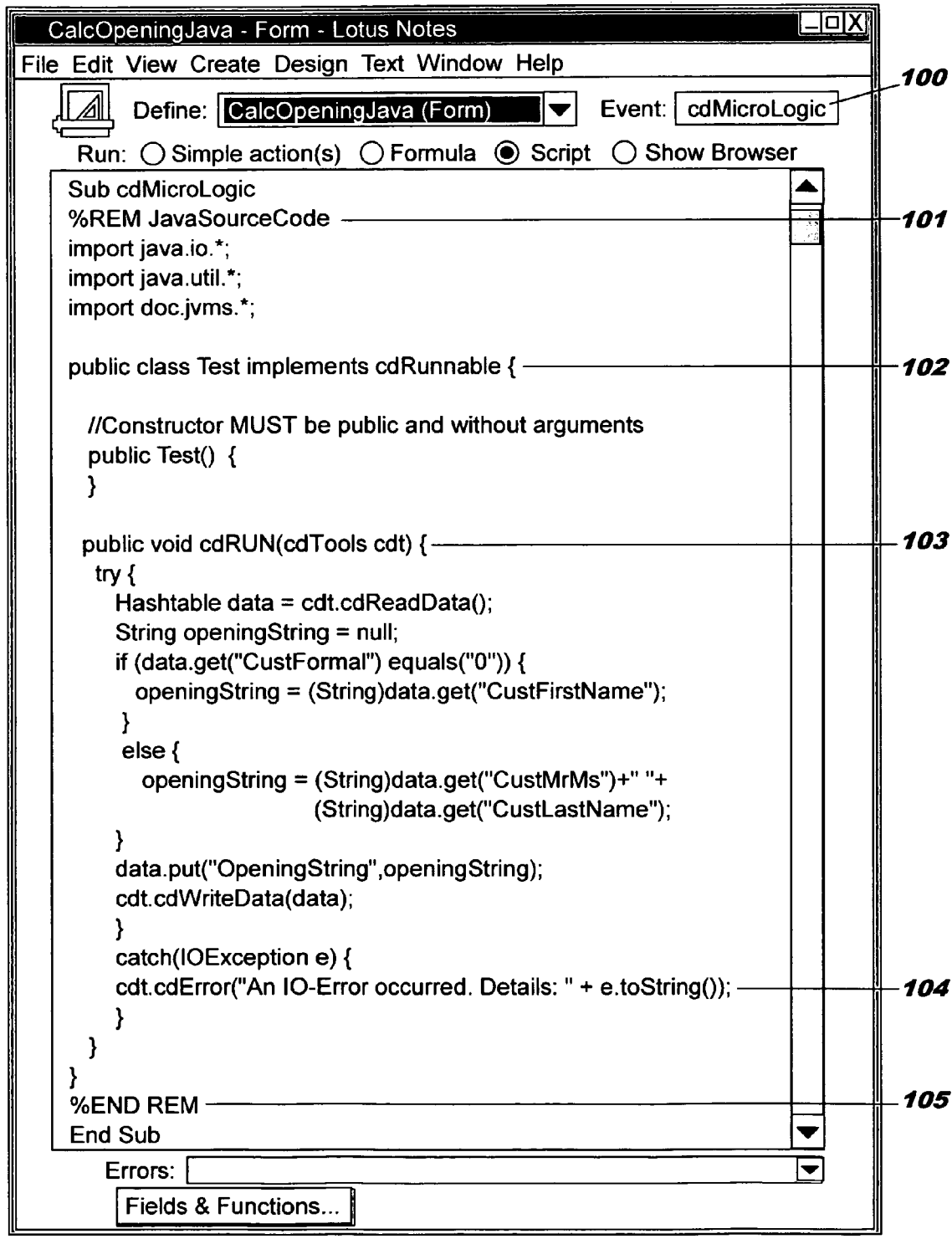
FIG. 1 is a screen shot showing schematically the storage of the source code of the user-selected language in an object of the existing application, in this case a Lotus Notes event.

The present invention is applicable for any existing application that allows the use of a macro language which is 'built-in' into the application program. The term 'built-in' is intended to cover any prior art provision of making a macro language available to the user of the program, i.e., it includes all macro languages mentioned above which are regularly comprised of the application program package or any additional extension kit when it is ordered from the licensor.

Using this macro language should allow access to objects belonging to this application. The term 'object' is intended to have a very large scope. It is explicitly intended to cover objects in the sense of Object Oriented Programming (OOP). But beyond that, the term is intended to generally covers any logical data structure like, e.g., a file, a set of data within a database, a file attachment, the content of a variable, or parts of it, etc. Thus, an object within the existing application can be read or write accessed through the built-in macro language or via an application programming interface (API).

In the context of this description, the term 'existing application' is intended to mean an application that has to be taken as it is, i.e., a change in the source code of the application and a recompilation shall be strictly avoided. As an example of such an existing application, Lotus Notes is used in the following description. The following description will show how the present invention permits an end user of Lotus Notes to use the Java language as a macro language instead of the natively built-in macro language Lotus Script.

The central idea of the following embodiment is to store all relevant information, i.e., the Java source code, Java bytecode, and the Java Bytecode Processing Server (BPS), in objects provided by the existing application. It is also possible to store the Java virtual machine and the Java compiler into objects.

Java source code is a program written in the Java programming language. Java bytecode is the binary output after compiling a Java program with the Java compiler. This bytecode contains machine instructions for a virtual processor, which is a processor not implemented in hardware. To process this bytecode, a virtual machine is needed. A Java virtual machine simulates a hardware processor through software and translates these instructions into instructions of an existing hardware processor. The virtual machine can be started every time the processing of bytecode is needed or it can remain on, like, for example, how the Java virtual machine remains on in many web browsers. In this description, a Java Bytecode Processing Server (BPS) is a Java virtual machine that is able to process Java bytecode and remains started all the time. This server forms part of one aspect of the present invention.

The goal is to integrate a user-selected language (Java) as an alternative to the built-in macro language so smoothly that it appears transparent to an end user. This is intended to be appreciated by a person skilled in the art when reading the following description in conjunction with the drawings.

With general reference to the figures and with special reference now to FIG. 1. FIG. 1. Shows a user interface with which a Notes user may create a program using its macro language. The program being created is associated with an event in Notes, which is identified in an event box 100. A Lotus Script program is created and is filled with Java source code. The Java source code is the program written by the end user to modify or extend the functionality of the application. The Lotus Script program is the above-mentioned stub, which functions to initiate the non-native macro program. To accomplish this, the end user has first to define an object where the Java source code should be stored. In this example, a new event called cdMicroLogic belonging to a Notes document is used and identified in the event box 100.

The next step is to put a Java program into this event. Because some Notes versions check the syntax, the whole Java program has to be placed between statements in the Lotus Script program. In FIG. 1, a "%REM JavaSource-Code" statement 101 and "%END REM" statement 105 are employed. In this way, the Java program appears to be only a comment within the Lotus Script language, and therefore a valid Lotus Script program has been created.

Figure 2:
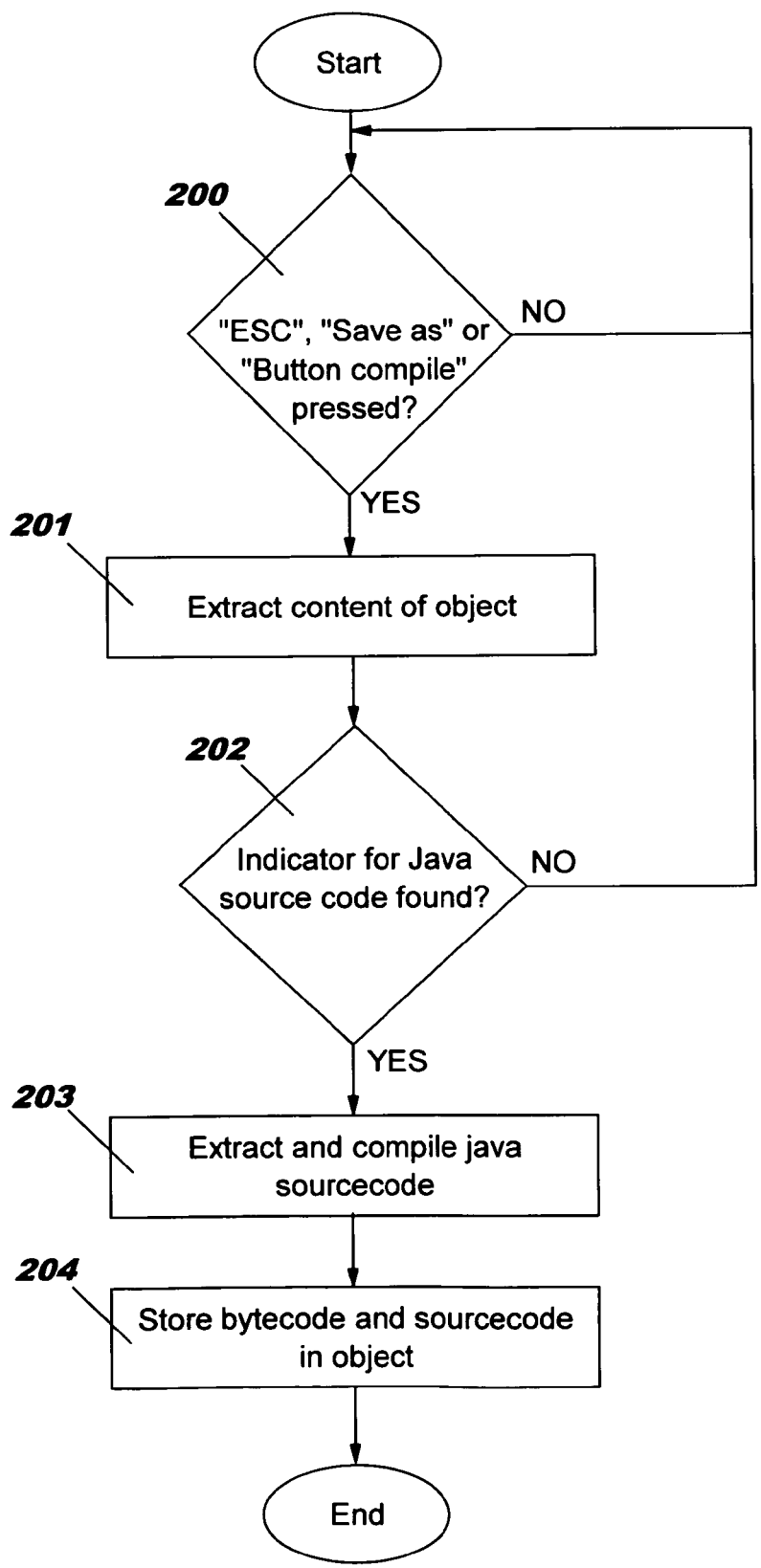
FIG. 2 a schematic representation of essential steps to be performed when the self-selected programming language needs a compiler to be executed, and hoe compilation works.

With reference now to the flowchart of FIG. 2, when the end user has finished creating the program, he exits the current Notes form, i.e., document template, which includes the event with the Java program. This can be done in any of a number of ways, depending on the application. For example the end user may press the ESC button, choose the save option from the File menu, etc. (Step 200).

Every action of the end user, and thus the above-mentioned actions, can be monitored via an application message hook. A hook is a function which can access information in a queue. An application message queue is a queue provided by a message-based application, like Notes. The application message hook usually is a self-written DLL that is loaded at the moment the application is started. As soon as the ESC or File save message is received from the hook (i.e., Step 200 has been carried out), a self-written function is called. This function uses the C-API from Lotus Notes to extract the contents of the new Notes event 100 (Step 201).

Next, the Java source code, located between the "%REM JavaSourceCode" and "%END REM" statements 101, 105, is written into a file, and an indicator for Java source code is searched by the function (Step 202).

If the indicator is found in Step 202, a Java compiler is called, and this file is used as an input file to the compiler. The resulting output file contains the java bytecode. The self-written function takes this Java bytecode and merges it along with the Java source code back into the Notes event. The new content of the Notes event after processing is the Java source code and the Java bytecode (Step 204).

If the escape key or save function is not selected in Step 200, or no indicator is found in Step 202, control is returned back to the user-action monitor (Step 200).

Figure 3:
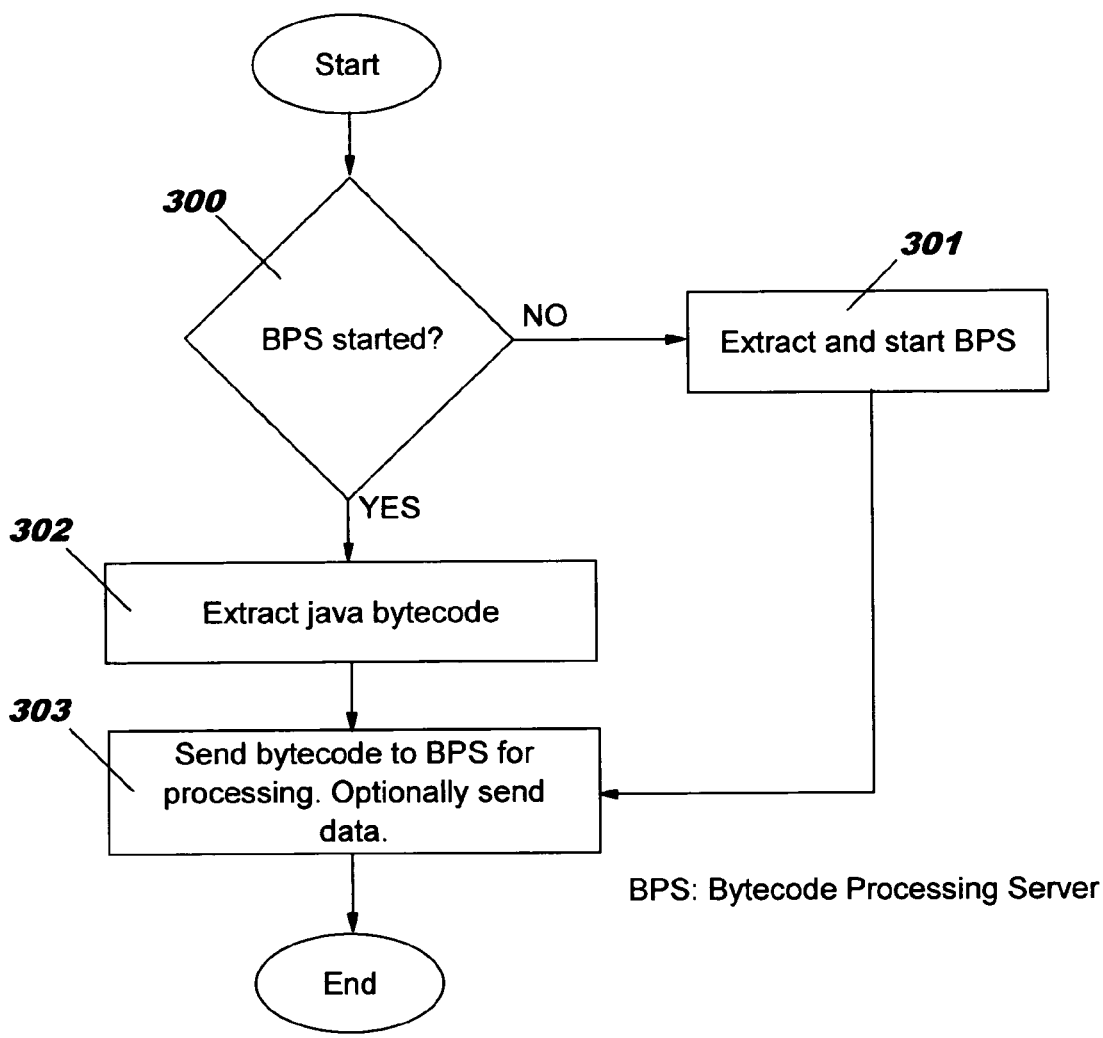
FIG. 3 a schematic representation showing the basic steps of processing the code of the user-selected language during runtime.
Figure 4:
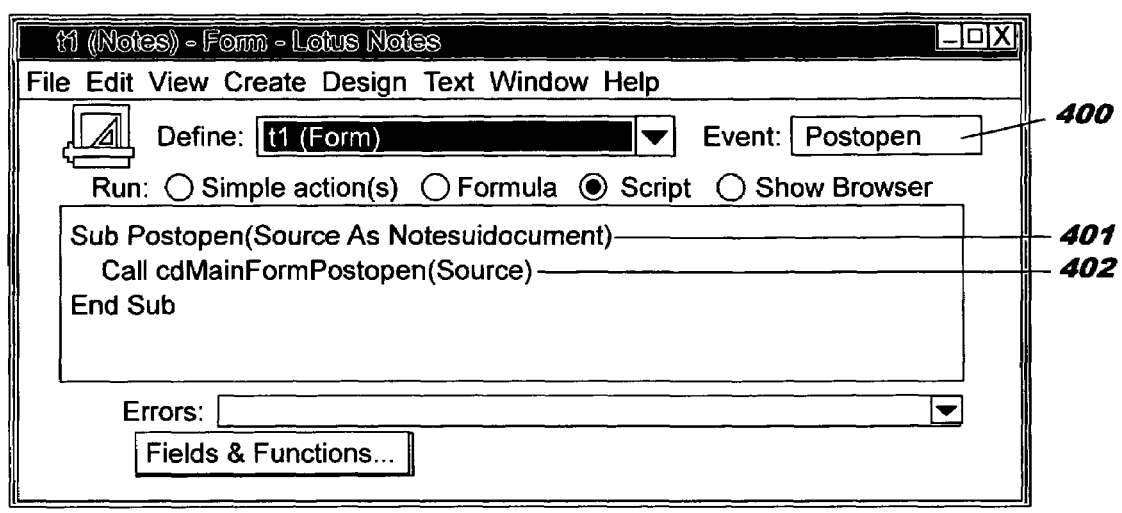
FIG. 4 is a screen shot showing schematically a stub written in the built-in macro language of the existing application.
Figure 5:
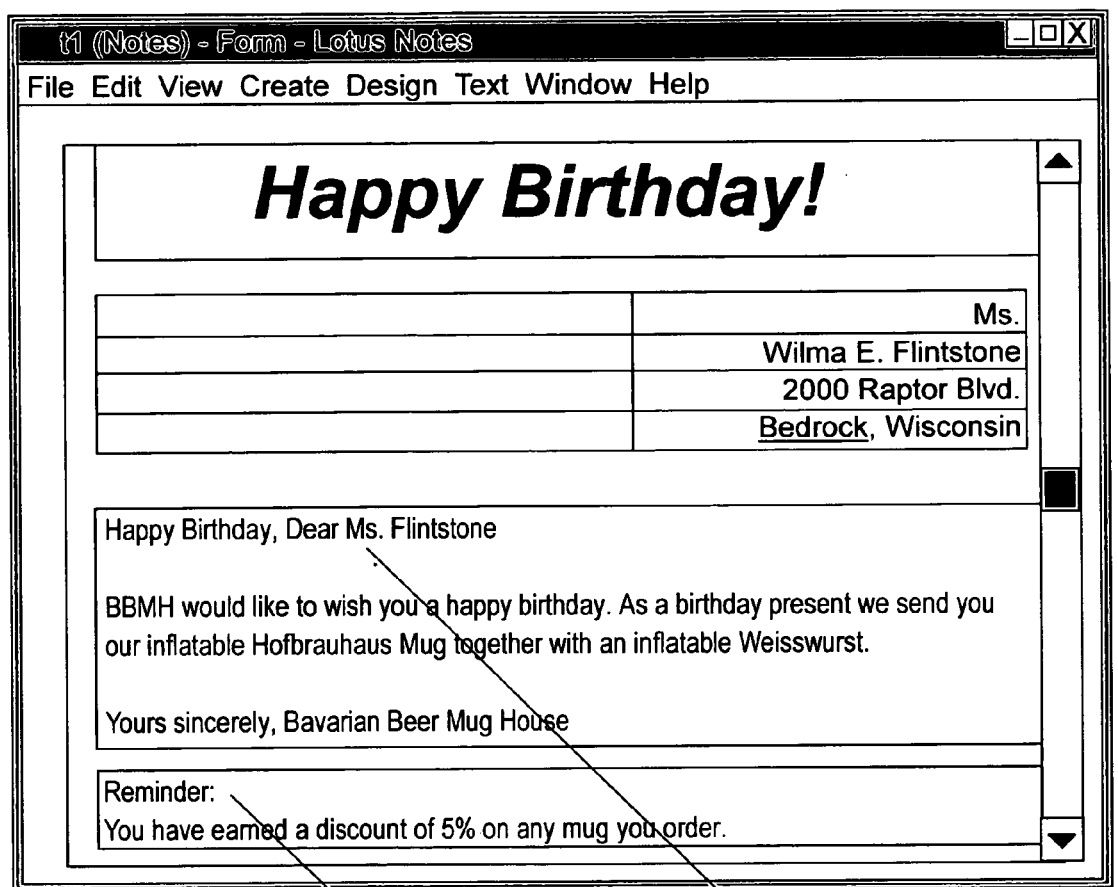
FIG. 5 is a screen shot showing schematically the result of the example using the user-selected language.

While FIGS. 1 and 2 show aspects of the present invention relevant while generating the macro, FIGS. 3, 4 and 5 illustrate runtime aspects of the present invention, and will now be discussed.

The built-in macro language is called during runtime whenever a specific event occurs. The same happens in accordance with the present invention when using the user-selected language, Java. The difference is that the built-in macro language is only used as a stub which performs the following functions.

First, it is determined in Step 300 whether the Java bytecode processing server (BPS) is up and running. If not, the BPS is detached and started, (Step 301). Then, the Java bytecode which is stored in an Object between the "%REM JavaByteCode" and "%END REM" statements is extracted (Step 302).

The extracted bytecode is then sent to the Java bytecode processing server and processed. Optionally, data can be sent to be manipulated (Step 303).

In more detail, the processing of the Java bytecode during runtime is performed according to the following scheme.

FIG. 4 illustrates a Notes screen capture showing a script having a stub in accordance with the present invention. Whenever a specific event occurs in the application having the user-created program, such as Notes, like for example PostOpen which is called when a Notes document is opened, or QueryClose, Initialize or Terminate, the built-in macro language can be used to run a self-written program.

The same is true when using Java, the user-selected language of choice. When the original Notes event takes place, in this example the event is a Postopen event, as identified in event box 400. A script which is executed upon occurrence of the event is shown in the script area, and includes a program written in the built-in macro language is called. This "program" consists of one line 402, which calls a self-written function having the name cdMainForm-PostOpen.

This function references the Java source code and the byte code and first checks whether the Java bytecode processing server (BPS) is started (Step 300). If not, the BPS is detached. In the example, the BPS is assumed to be attached to a specific Notes document belonging to the same database. Since the BPS itself is written in Java, it is started via starting a Java virtual machine with the BPS as program to process. Alternatively, BPS and JVM (Java virtual machine) could be a single program.

After starting the BPS, the function cdMainForm-PostOpen 402 extracts the Java bytecode from the event 100 (Step 302). The bytecode is written into a file. Then, the function 402 calls the BPS via TCP/IP, step 303, assuming a network situation in which one and the same application program is used via network by a plurality of users, telling the application server which program, i.e., which detached bytecode, i.e., which file to process.

Parameter passing to the Java code is almost transparent to the end user. All the parameters needed are given to said function 402. This function passes the parameters via TCP/IP to the BPS. The BPS loads the Java code and passes the parameters when starting the processing of the code to this Java code. In the example, the parameters are passed via a Java object called cdTools 103, (FIG. 1). This object contains all the input parameters and provides methods for the end user to access them.

After processing the Java bytecode through the BPS, the passing of return values works just the same like the parameter passing, The object cdTools 103 provides, for example, a method cdError( ) 104 to report errors back to the function 402.

Via parameter passing and return values, the data on which the Java programs work is passed indirectly. In the example, one parameter is the name of a data file containing data for the Java program to work on. The results of the processing are also written in the same file.

The described example actually computes some contents of a document. When opening a specific document, the Postopen event starts a Java program as described above. This Java program accesses data held in relational databases, like customer first name and last name, a Mr./Mrs. Flag, a "formal" flag indication whether the customer wishes a formal or informal opening and discount information. Based on this information, an opening string 502 of a document is computed (FIG. 5). Depending on the discount information, a "Reminder" building block 501 is merged into the document. If the discount is for example 0%, the reminder block will not be included in the document.

In the foregoing specification, the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense. For example, in the Lotus Notes based embodiment of the invention described herein, there are many explicit or implicit design decisions. Some implementation alternatives will now be discussed.

First, the code which comprises the program may be stored in different manners. The Java source code may be stored in Notes ScriptLibraries, as Notes Agents or as an attachment to a Notes document. Generally speaking, the source code can be stored as any object within the existing application that can be accessed through the built-in macro language or via an API.

In the example described above, the Java source code was stored between "%REM JavaSourceCode" and "%END REM" statements. In doing this, the Java source code is stored as a comment according to the syntax of the Notes built in macro language Lotus Script. If the existing application allows a Java syntax or does not check the syntax at all, this "workaround" is obsolete.

For other application programs than Lotus Notes similar considerations apply.

Second, different language may be utilized. Java is a compiler language for a virtual processor. The user-selected language could also be an interpreter language. This simplifies the design, since there is no compilation needed and the compiled code does not have to be attached to an object.

Concerning compiler languages, it was mentioned in the example that an application message hook is needed to retrieve the ESC or the File-save command message. These messages can be the trigger for the start of the compilation. This design is only necessary to provide as much "ease of use" to the end user as possible. It would only mean little impact to the end user to press a Compile button instead or any other suitable graphical user interface (GUI) element the built-in macro language offers. Of course, a GUI element like this can be used to compile one or more programs written in the user-selected language. This means that the application message hook is not a necessary technical feature the present invention is depending on.

Also, if a compiler language is used, the compiled code has to be stored in an object of the existing application. In the example, this is the event object 100 below the Java source code. For the compiled code, the same is true as for the source code. It can also be stored in any object the existing application offers. Of course, objects might be used that can not be seen or accessed by the end user himself, but by the program only.

Another alternative concerning a compiler language would be to compile the source code on the fly during runtime. In this case, no compilation in advance is needed and no storing of the resulting compiled code is required. Of course this means an impact on performance.

Third, the Bytecode Processing Server (BPS) can be implemented different manner. Generally speaking, the bytecode processing server is a server that is able to process the user-selected macro language, no matter if it is a compiler language for a virtual processor or an interpreter language. In the above example, the BPS is written in Java. This means that a Java virtual machine is needed to run this server. The BPS could also be written in the C programming language. In this case, the Java virtual machine and the BPS would be one program, and the requirement for a separate virtual machine would be obsolete.

The BPS could be detached and be executingon a computer in a network. In this scenario, several users could simultaneously use one BPS and the processing of the code would take place on a different processor.

To increase performance, one BPS could be detached and started several times. There are prior art mechanisms for one BPS to detect other BPS's and dispatch the processing of a program written in the user-selected language to another BPS if need be. This can be used with the synergistic effect of combining the present invention with independent Java runtime facilities.

A pre-installation of the BPS would also be possible, thus avoiding the need to detach and initiate it. But this would undermine the before-mentioned basic advantage of the invention, i.e., to use an existing application with a user-selected macro language without the requirement to install a specific program in advance.

The technique discussed above concerning the storage of Java source code and the Java bytecode is also true for the BPS. Any object of the existing application may be utilized to store the BPS.

Another variation is to use a compiler language for an existing processor even if there are the disadvantages of the size of the programs, the loss of platform independence and in most cases the complexity of the language for end users to consider.

Finally, parameter and data passing can be implemented in various manners. It is possible to pass all the parameters for the user-selected language via a file instead of sending them via a TCP/IP or other network connection. The data, on the other hand, can be sent via TCP/IP or any other network connection instead of being transferred to the BPS via a file.

In the preferred embodiment, all parameters are passed through the object cdTools 103, which contains all the parameters and provides methods to access them. This is an arbitrarily chosen design decision. It is also possible to pass all the parameters in the corresponding native format. The same is true for the return values.

Some parts of the preferred embodiment use the Notes C API. This is, however, just an arbitrarily chosen design decision as well. The same results can also be achieved by using Lotus Script only. It is also a design decision where and how the source code and compiled code are stored in Notes objects. The same is true for the event handling.

As can be appreciated from the totality of the above teachings, the inventive concepts primarily include the storage of the source code of the user-selected language in objects of the existing application and, if the language is a compiler language, the storage of the compiled code and the compilation itself.

Further, the concept of a BPS is included which itself is stored in an object of the existing application, thereby allowing the use of the new macro language anywhere without additional installation efforts. Also important is the communication between the BPS and the existing application via a stub written in the built-in macro language. This comprises parameter passing and data transfer.

Finally, it should be noted that the inventive concepts can be extended to generate and run macro modules which comprise more than two languages. For this, prior art cross-language calls can be used in a subsequent manner.

The present invention can be embedded in a computer program product, e.g., an application program product as mentioned further above which comprises all the features enabling the implementation the respective steps of the methods described herein, and which, when loaded in one or more computer systems, is able to carry out these methods. Computer program means or a computer program in the present context mean any expression, in any language, code or notation, of a set of instructions intended to cause a system having an information processing capability to perform a particular function either directly or after either or both of conversion to another language, code or notation and reproduction in a different material form.

Although the present invention has been described with respect to a specific preferred embodiment thereof, various changes and modifications may be suggested to one skilled in the art and it is intended that the present invention encompass such changes and modifications as fall within the scope of the appended claims.

The invention claimed is:

1. A method for creating a macro module for use with an application program which provides at least one native macro language, the macro module including code written in a non-native macro language to said application program, said method comprising the steps of:

storing source code for a program written in a non-native macro language in one or more objects associated with said application program;

creating a stub written in a native macro language which initiates execution of the program upon occurrence of a pre-determined event;

wherein the non-native macro language is an interpreter language, said method further comprising the step of:

storing a means for interpreting programs written in the non-native macro language in one or more objects of the application program.

2. A method for creating a macro module for use with an application program which provides at least one native macro language, the macro module including code written in a non-native macro language to said application program, said method comprising the steps of:

storing source code for a program written in a non-native macro language in one or more objects associated with said application program;

creating a stub written in a native macro language which initiates execution of the program upon occurrence of a pre-determined event;

wherein the non-native macro language is a late binding language, said method further comprising the step of:

storing byte code generating means in one or more objects of the application program.

3. A method for creating a macro module for use with an application program which provides at least one native macro language, the macro module including code written in a non-native macro language to said application program, said method comprising the steps of:

storing source code for a program written in a non-native macro language in one or more objects associated with said application program;

creating a stub written in a native macro language which initiates execution of the program upon occurrence of a pre-determined event;

wherein the non-native macro language is an early binding language, said method further comprising the step of:

storing compiler means in one or more objects of said application program.

4. Computer readable code for permitting use of a non-native macro language with an application program, comprising:

first subprocesses for executing code derived from source code of a program written in the non-native macro language; and a macro module including code written in a native macro language and the source code of the program written in the non-native macro language stored as one or more comment for the native macro language code.

5. Computer readable code according to claim 4, wherein said first subprocesses comprises an interpreter, compiler means, or byte code converting means.

6. Computer readable code according to claim 4, wherein said first subprocesses is an interpreter or byte code converting means.

* * * * *